(12) United States Patent
Postec et al.

(10) Patent No.: US 11,982,209 B2
(45) Date of Patent: May 14, 2024

(54) VANE MADE OF COMPOSITE MATERIAL HAVING A THREE-DIMENSIONAL WOVEN FIBROUS REINFORCEMENT AND TWO-DIMENSIONAL WOVEN SKIN AND METHOD FOR MANUFACTURING SAME

(71) Applicant: SAFRAN AIRCRAFT ENGINES, Paris (FR)

(72) Inventors: Clément Pierre Postec, Moissy-Cramayel (FR); Thomas Alain De Gaillard, Moissy-Cramayel (FR); Teddy Fixy, Moissy-Cramayel (FR); Eddy Keomorakott Souryavongsa, Moissy-Cramayel (FR)

(73) Assignee: SAFRAN AIRCRAFT ENGINES, Paris (FR)

(*) Notice: Subject to any disclaimer, the term of this patent is extended or adjusted under 35 U.S.C. 154(b) by 0 days.

(21) Appl. No.: 18/010,751

(22) PCT Filed: Jun. 9, 2021

(86) PCT No.: PCT/FR2021/051035
§ 371 (c)(1),
(2) Date: Dec. 15, 2022

(87) PCT Pub. No.: WO2021/255366
PCT Pub. Date: Dec. 23, 2021

(65) Prior Publication Data
US 2023/0193766 A1    Jun. 22, 2023

(30) Foreign Application Priority Data

Jun. 18, 2020  (FR) .................................... 2006378

(51) Int. Cl.
*F01D 5/28*  (2006.01)
*B29C 70/22*  (2006.01)
(Continued)

(52) U.S. Cl.
CPC ............ *F01D 5/282* (2013.01); *B29C 70/222* (2013.01); *B29C 70/34* (2013.01); *B29C 70/86* (2013.01);
(Continued)

(58) Field of Classification Search
CPC ............... F01D 5/14; F01D 5/28; F01D 5/282
See application file for complete search history.

(56) References Cited

U.S. PATENT DOCUMENTS

| 4,648,921 | A | * | 3/1987 | Nutter, Jr. ............... B29C 70/46 |
| | | | | 29/889.6 |
| 7,101,154 | B2 | | 9/2006 | Dambrine et al. |

(Continued)

FOREIGN PATENT DOCUMENTS

| EP | 2 458 153 A2 | 5/2012 |
| EP | 3 564 487 A1 | 11/2019 |

(Continued)

OTHER PUBLICATIONS

International Preliminary Report on Patentability and the Written Opinion of the International Searching Authority as issued in International Patent Application No. PCT/FR2021/051035, dated Dec. 13, 2022.

(Continued)

*Primary Examiner* — Woody A Lee, Jr.
*Assistant Examiner* — Cameron A Corday
(74) *Attorney, Agent, or Firm* — Pillsbury Winthrop Shaw Pittman LLP

(57) ABSTRACT

A blade for an aircraft gas turbine engine includes, in a longitudinal direction, a blade root, a shank and an aerofoil body, the aerofoil body extending in the longitudinal direction between the shank and a blade tip and in a transverse direction between a leading edge made of metal material and a trailing edge. The blade includes a blade core made of (Continued)

composite material having a three-dimensional woven fibrous reinforcement forming the blade root, the shank and a part of the aerofoil body. The blade also includes a skin made of composite material having a two-dimensional woven fibrous reinforcement surrounding the aerofoil body part of the blade core, the skin being interposed between the leading edge made of metal material and a front edge of the aerofoil body part of the blade core to define a thinned leading edge portion, the skin including one or more two-dimensional woven plies.

6 Claims, 6 Drawing Sheets

(51) Int. Cl.
    *B29C 70/34*     (2006.01)
    *B29C 70/86*     (2006.01)
    *B29K 307/04*     (2006.01)
    *B29K 705/00*     (2006.01)
    *B29L 31/08*     (2006.01)
    *F01D 5/00*     (2006.01)
    *F01D 5/14*     (2006.01)

(52) U.S. Cl.
    CPC ............ *F01D 5/005* (2013.01); *F01D 5/147* (2013.01); *B29K 2307/04* (2013.01); *B29K 2705/00* (2013.01); *B29L 2031/082* (2013.01); *F05D 2220/32* (2013.01); *F05D 2230/23* (2013.01); *F05D 2230/80* (2013.01); *F05D 2240/30* (2013.01)

(56) References Cited

U.S. PATENT DOCUMENTS

| | | | |
|---|---|---|---|
| 7,165,945 B2 * | 1/2007 | Kovalsky | B29C 70/222 416/241 A |
| 7,241,112 B2 | 7/2007 | Dambrine et al. | |
| 7,547,193 B2 * | 6/2009 | Moffitt | B64C 27/473 416/223 R |
| 10,239,604 B2 * | 3/2019 | Foskey | B64C 11/24 |
| 2005/0084377 A1 | 4/2005 | Dambrine et al. | |
| 2011/0038732 A1 * | 2/2011 | Huth | F04D 29/324 427/299 |
| 2011/0182743 A1 * | 7/2011 | Naik | F01D 5/282 29/889.71 |
| 2017/0355446 A1 * | 12/2017 | Andrzejewski | F16C 33/62 |
| 2019/0217943 A1 * | 7/2019 | Courtier | B29C 70/545 |
| 2019/0360345 A1 | 11/2019 | De Gaillard et al. | |

FOREIGN PATENT DOCUMENTS

| | | |
|---|---|---|
| FR | 3 040 909 A1 | 3/2017 |
| FR | 3 070 425 A1 | 3/2019 |
| WO | WO 2010/061140 A1 | 6/2010 |
| WO | WO 2019/186029 A1 | 10/2019 |

OTHER PUBLICATIONS

International Search Report as issued in International Patent Application No. PCT/FR2021/051035, dated Jul. 28, 2021.

* cited by examiner

[Fig. 1]
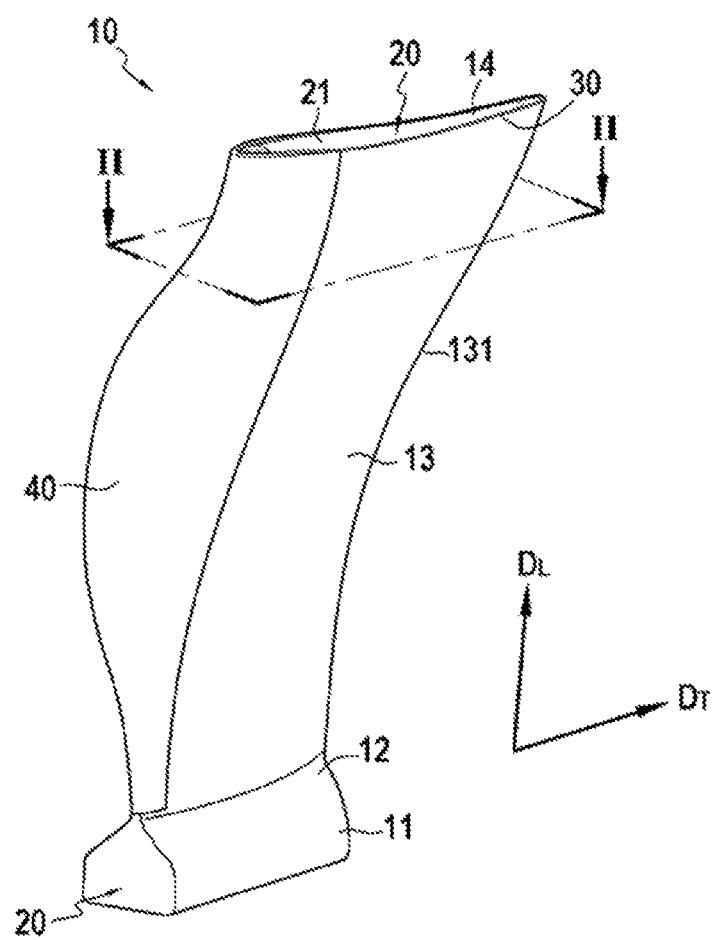

[Fig. 2]
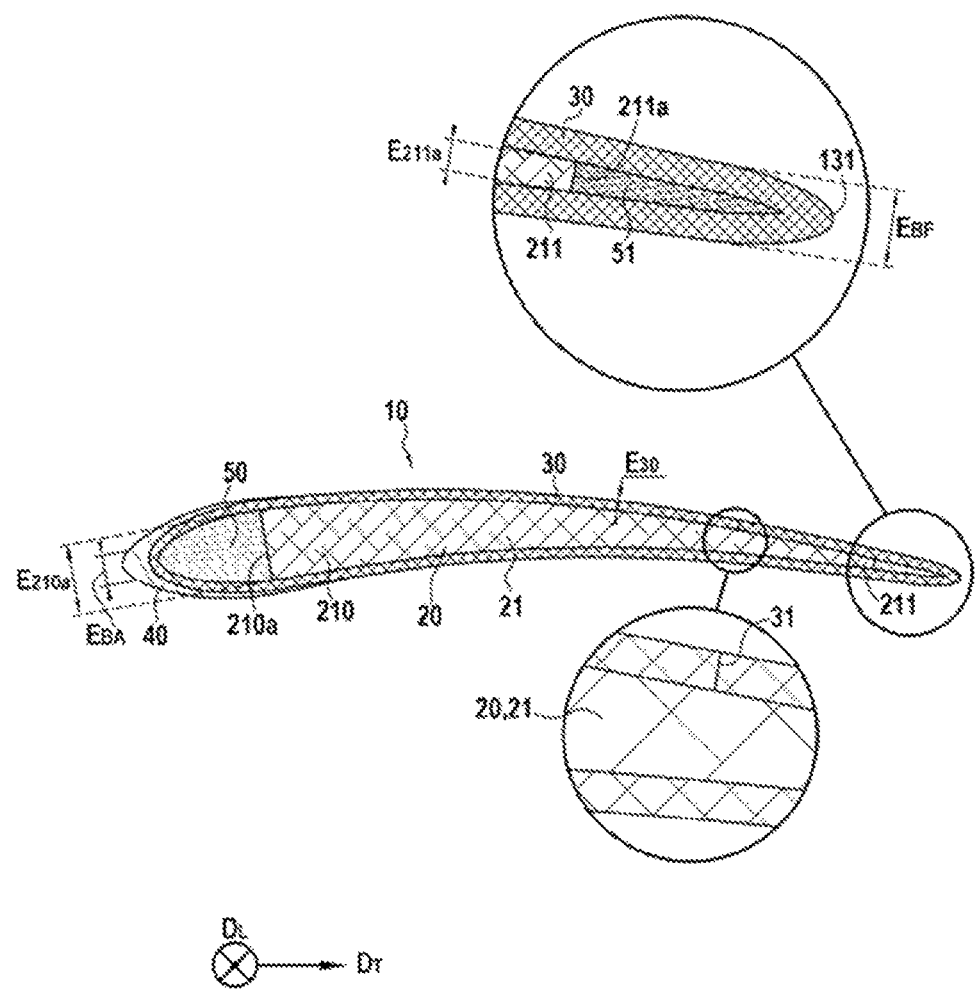

[Fig. 3]
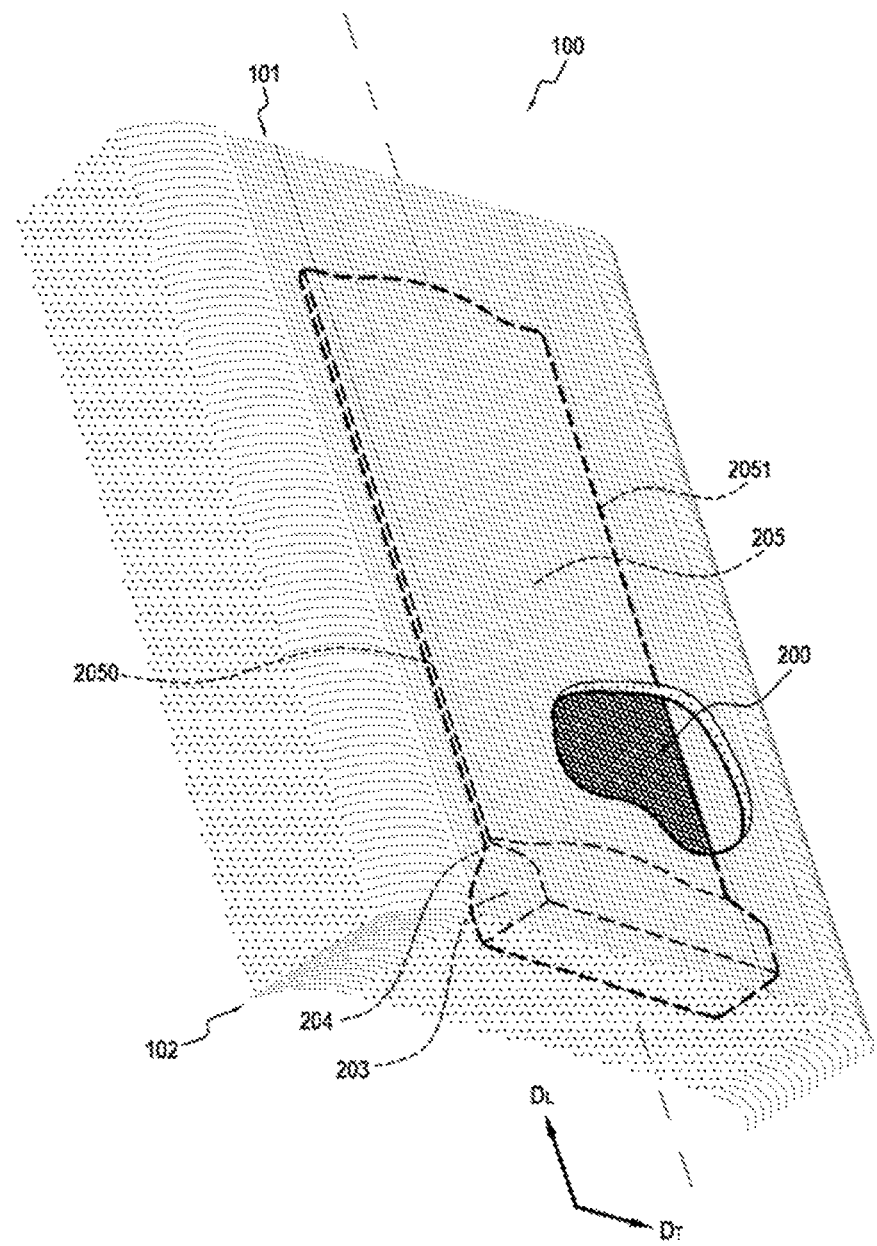

[Fig. 4]
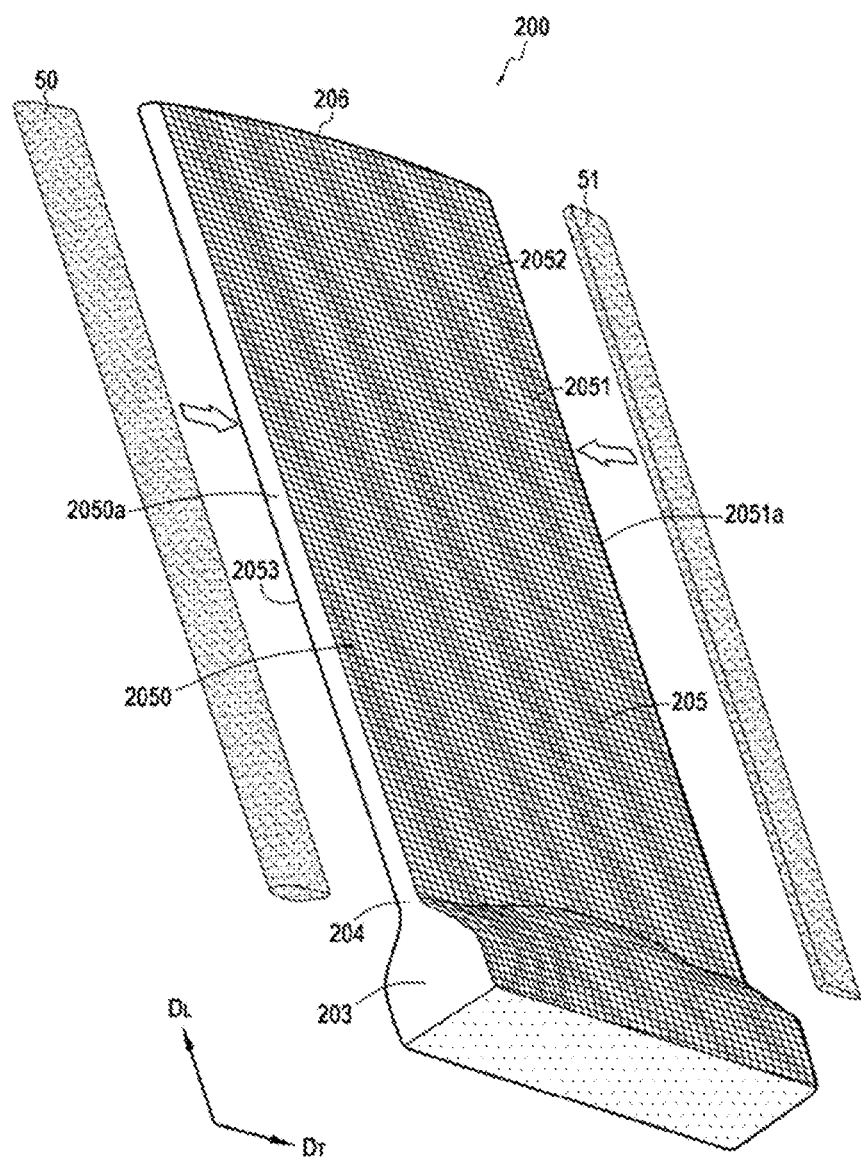

[Fig. 5]
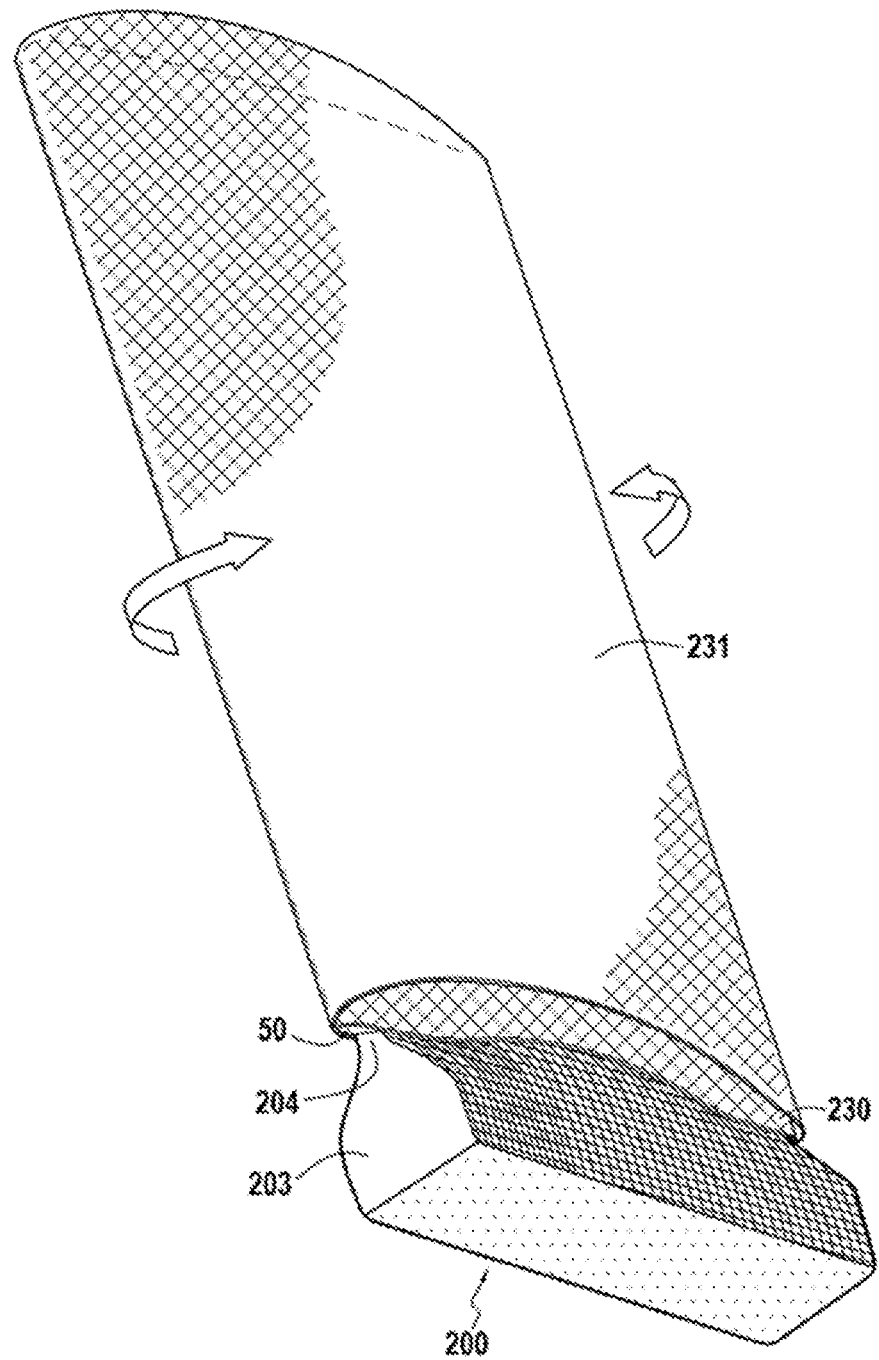

[Fig. 6]
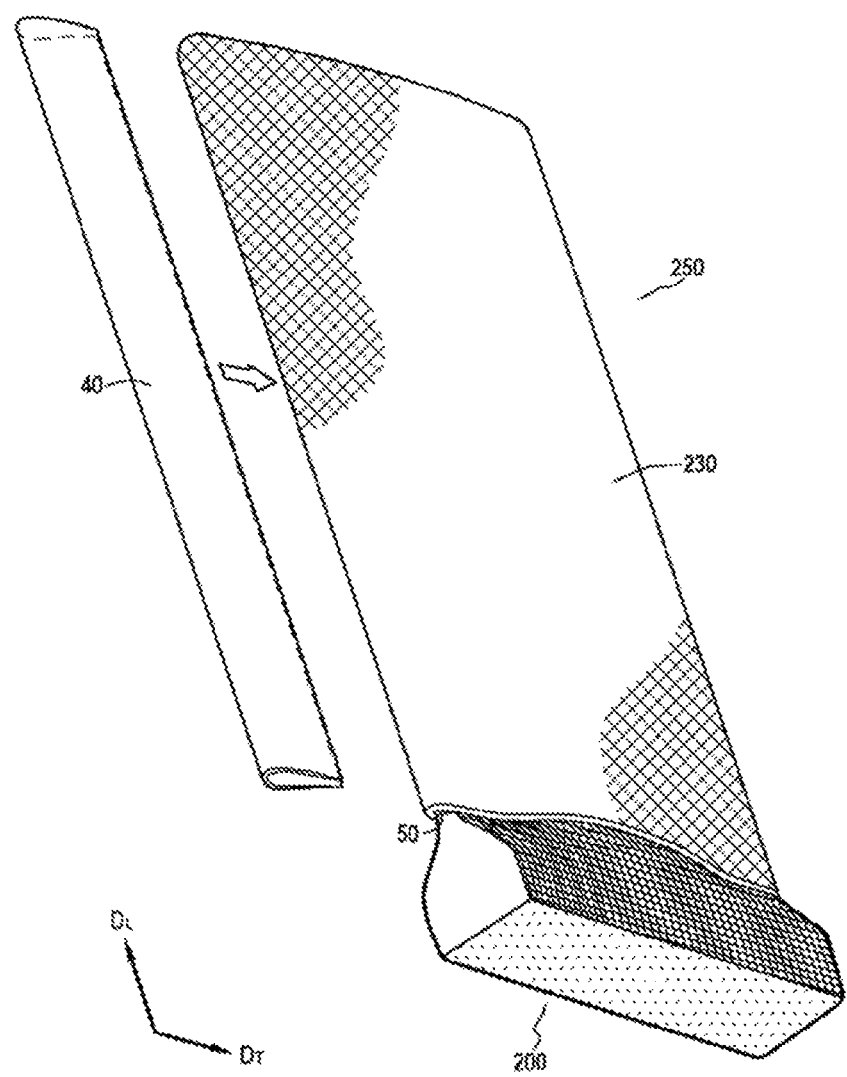

VANE MADE OF COMPOSITE MATERIAL HAVING A THREE-DIMENSIONAL WOVEN FIBROUS REINFORCEMENT AND TWO-DIMENSIONAL WOVEN SKIN AND METHOD FOR MANUFACTURING SAME

CROSS-REFERENCE TO RELATED APPLICATIONS

This application is the U.S. National Stage of PCT/FR2021/051035, filed Jun. 9, 2021, which in turn claims priority to French patent application number 2006378 filed Jun. 18, 2020. The content of these applications are incorporated herein by reference in their entireties.

TECHNICAL FIELD

The present invention relates to the general field of manufacture of blades made of composite material having a fibrous reinforcement densified by a matrix, the matrix being obtained by injecting a liquid composition containing a precursor of the matrix into a fibrous preform.

PRIOR ART

A target field is that of gas turbine blades for aircraft engines or industrial turbines and, more particularly but not exclusively, fan blades for aircraft engines.

The manufacture of a blade made of composite material comprises the following steps:
a) producing a fibrous structure by three-dimensional or multilayer weaving,
b) compacting and shaping the fibrous structure,
c) placing the fibrous preform obtained in this way in an injection moulding tool (RTM),
d) injecting a liquid precursor composition of a matrix material, such as a resin, into the fibrous preform,
e) transforming the liquid composition into a matrix so as to obtain a profiled element made of composite material comprising a fibrous reinforcement densified by a matrix.

The production of a blade made of composite material obtained from a fibrous reinforcement produced by three-dimensional weaving and densified by a matrix is described, in particular, in document US 2005/0084377.

Three-dimensional (3D) or multilayer weaving gives the resulting blade made of composite material a very good mechanical strength. However, the good mechanical strength given by the three-dimensional or multilayer weaving is more difficult to obtain in parts of the blade having a low thickness, of order several millimetres, as is the case at the leading and/or trailing edge of a blade. Indeed, from a mechanical point of view and in accordance with the certification requirements, the leading edge and the trailing edge must be able to withstand or limit damage when they are subject to various stresses, such as impacts with birds or the repetition of flight cycles (erosion/lifespan).

The difficulty in obtaining portions of low thickness with a good mechanical strength by three-dimensional weaving is explained by:
the large size or titre of the strands or yarns used for the 3D or multilayer weaving, which is of millimetre order, and
the number of layers of warp or weft strands or yarns necessary in order to ensure a good mechanical strength, because it is more difficult to obtain an optimum mechanical strength by interlacing only two layers of yarns (minimum number of warp or weft layers of yarns in order to form a 3D or multilayer weaving) than by interlacing a larger number of layers of yarns.

From the point of view of aerodynamic performance, the reduction in the thickness of the upstream (leading edge) and downstream (trailing edge) ends of a fan blade can increase the aerodynamic efficiency and behaviour. Indeed, a reduction in thickness of the leading edge and/or of the trailing edge makes it possible to limit the bypassing of the blade profile. This bypassing leads to a Mach peak on the transonic and supersonic sections (at the head of the blade) which is detrimental to the performance of the fan. Moreover, the reduction in thickness reduces profile losses at the trailing edge (base loss) mainly for the sections above 60% in height. This reduction in thickness has a direct impact on the efficiency of the machine and thus its consumption.

DISCLOSURE OF THE INVENTION

The object of the present invention is therefore to provide a solution for a blade made of composite material which does not have the above-mentioned disadvantages and which enables fine parts to be formed easily on the blade with good mechanical properties.

For this purpose, the invention proposes a blade for an aircraft gas turbine engine comprising, in a longitudinal direction, a blade root, a shank and an aerofoil body, the aerofoil body extending in the longitudinal direction between the shank and a blade tip and in a transverse direction between a leading edge made of metal so material and a trailing edge, the blade comprising a blade core made of composite material having a three-dimensional woven fibrous reinforcement forming the blade root, the shank and an aerofoil body part, characterised in that it further comprises a skin made of composite material having a two-dimensional woven fibrous reinforcement surrounding the aerofoil body part of the blade core, the skin being interposed between the leading edge made of metal material and a front edge of the aerofoil body part of the blade core so as to define a thinned leading edge portion, the skin comprising one or more two-dimensional woven plies, each wound around the aerofoil body part of the blade core, the skin further defining the trailing edge.

Hence, in the blade according to the invention, the leading edge and/or the trailing edge of the blade are sized by means of a skin having a two-dimensional woven fibrous reinforcement which has, by definition, a smaller thickness than a three-dimensional weaving. Consequently, the blade according to the invention has a thinner leading edge and/or trailing edge than a blade made of composite material produced entirely from a three-dimensional woven fibrous reinforcement while having a good mechanical strength, in particular with respect to impacts, because the common matrix between the fibrous reinforcement of the blade core and the fibrous reinforcement of the skin made of composite material ensures the distribution of mechanical stresses or forces between the weaves of these two elements.

According to a particular feature of the blade according to the invention, the ends of each two-dimensional woven ply meet at a suction-side face of the aerofoil body, at a position corresponding to 50% or more of the chord length of the blade measured from the leading edge to the trailing edge of the blade. Hence, the fibrous reinforcement of the skin made of composite material has a continuous weave in the region of the leading edge of the blade, which ensures good mechanical strength in a region of the blade exposed to impacts with foreign bodies (birds, hail, etc.).

According to another particular feature of the blade of the invention, the leading edge and the trailing edge of the blade have a thickness of between 0.2 mm and 1.5 mm.

According to another particular feature of the blade of the invention, a filler material is present at least between the distal end of the front edge of the aerofoil body part of the blade core and the skin made of composite material. This enables better control of the final shape of the leading edge of the blade and avoids a lack of material between the front edge of the aerofoil body part of the blade core and the skin made of composite material.

According to another particular feature of the blade of the invention, the three-dimensional woven fibrous reinforcement of the blade core comprises carbon fibre yarns while the fibrous reinforcement of the skin comprises carbon fibre yarns and glass fibre yarns. The partial use of glass fibre yarns in the skin made of composite material, increases the deformation at break of the aerofoil body of the blade and, consequently, its impact resistance.

Another object of the invention is a method for manufacturing a blade for an aircraft gas turbine engine comprising at least:
producing, by three-dimensional weaving, a fibrous blade core blank,
cutting the fibrous blank in order to obtain a fibrous blade core preform comprising, in a longitudinal direction, a blade root preform part, a shank preform part and an aerofoil body part preform part, the aerofoil body part preform part extending in the longitudinal direction between the shank preform part and a tip and in a transverse direction between a front edge and a rear edge,
winding one or more two-dimensional woven plies around the aerofoil body part preform part,
positioning a leading edge made of metal material on the one or more two-dimensional woven plies at the front edge of the aerofoil body part preform part,
placing the blade core fibrous preform wound with the one or more two-dimensional woven plies and the leading edge into an injection mould,
injecting a resin into the blade core fibrous preform and into the one or more two-dimensional woven plies,
transforming the resin into a matrix so as to obtain a blade comprising a blade core made of composite material having a three-dimensional woven fibrous reinforcement, a skin made of composite material having a two-dimensional woven fibrous reinforcement present around an aerofoil body part of the blade core and a leading edge made of metal material fixed on said skin.

According to a particular feature of the method according to the invention, during the winding of one or more two-dimensional woven plies around the aerofoil body part preform part, the ends of each two-dimensional woven ply meet at the face of the aerofoil body part preform part that is intended to form the suction-side face of the blade and at a position corresponding to 50% or more of the chord length of the blade measured from the leading edge to the trailing edge of the blade.

According to another particular feature of the method of the invention, each two-dimensional woven ply has a thickness of approximately 0.2 mm.

According to another particular feature of the method of the invention, before the winding of one or more two-dimensional woven plies around the aerofoil body part preform part, a filler material is placed at least at the distal end of the front edge of the aerofoil body part preform part. This filler material may also be placed at the distal end of the rear edge of the spar preform part.

According to another particular feature of the method of the invention, the three-dimensional woven fibrous reinforcement of the blade core comprises carbon fibre yarns and the fibrous reinforcement of the skin comprises carbon fibre yarns and glass fibre yarns.

BRIEF DESCRIPTION OF THE FIGURES

FIG. 1 is a perspective view of a blade according to an embodiment of the invention, FIG. 2 is a cross-sectional view of the blade of FIG. 1, FIG. 3 shows, very schematically, a three-dimensional woven fibrous blank intended for the production of a blade core fibrous preform according to an embodiment of the invention, FIG. 4 is a schematic perspective view of a blade core fibrous preform obtained from the fibrous blank of FIG. 1, FIG. 5 is a schematic perspective view showing the winding of two-dimensional woven plies around of the blade core fibrous preform of FIG. 4, FIG. 6 is a schematic perspective view showing the placing of a metal leading edge on the preform of FIG. 5.

DESCRIPTION OF THE EMBODIMENTS

The blade according to the invention can constitute, in particular, a blade for shrouded moving wheels such as fan blades or a blade for unshrouded moving wheels such as in so-called "open rotor" aircraft engines.

FIG. 1 shows a fan blade 10 for an aircraft gas turbine engine, the blade comprising, in a longitudinal direction $D_L$, a blade root 11, a shank 12 and an aerofoil body 13, the aerofoil body extending in the longitudinal direction $D_L$ between the shank 12 and a blade tip 14 and in a transverse direction $D_T$ between a leading edge 40 made of metal material and a trailing edge 131.

As shown in FIGS. 1 and 2, the blade 10 comprises a blade core made of composite material 20 having a three-dimensional woven fibrous reinforcement forming the blade root 11, the shank 12 and an aerofoil body part 21 forming at least a part of the aerofoil body 13. The aerofoil body part extends in the longitudinal direction $D_L$ between the shank 12 and the blade tip 14 and in the transverse direction $D_T$ between a front edge 210 and a rear edge 211.

In accordance with the invention, the blade 10 further comprises a skin made of composite material 30 having a two-dimensional woven fibrous reinforcement, surrounding the aerofoil body part 21 of the blade core 20. The skin 30 is interposed between the leading edge made of metal material 40 and the front edge 210 of the aerofoil body part 21 of the blade core so as to define a thinned leading edge portion. In the example described here, a first filler material 50 which may be, in particular, a foam or a resin, is present between the distal end 210a of the front edge 210 of the aerofoil body part 21 of the blade core and the skin made of composite material 30. The skin 30 is also present around the rear edge 211 of the aerofoil body part 21 of the blade core so as to define a thinned trailing edge 131. In the example described here, a second filler material 51, which may be, in particular, a foam or a resin, is present between the distal end 211a of the rear edge 211 of the aerofoil body part 21 of the blade core and the skin made of composite material 30.

However, the blade according to the invention can be produced without filler material at the front and rear edges of the aerofoil body part.

As described below, the skin made of composite material 30 comprises one or more two-dimensional woven plies, each wound around the spar of the blade core.

FIG. 3 shows, very schematically, the weave of a fibrous blank 100 from which a blade core fibrous preform 200 can be extracted (FIG. 4).

The fibrous blank 100 is obtained by three-dimensional weaving, or 3D weaving, or by multilayer weaving performed in known manner by means of a jacquard loom on which a bundle of warp yarns or strands 101 has been arranged in a plurality of layers, the warp yarns being linked by weft layers 102 which are also arranged in a plurality of layers, certain warp layers comprising braids, as described in detail below. In the illustrated example, the 3D weaving is an "interlock" weave. Here, the term "interlock" weave means a weave in which each layer of weft yarns links a plurality of layers of warp yarns with all the yarns of the same weft column having the same movement in the weave plane. A detailed exemplary embodiment of a fibrous preform for forming the fibrous reinforcement of a blade for an aircraft engine from a 3D woven fibrous blank is described in detail, in particular, in documents U.S. Pat. Nos. 7,101,154, 7,241,112 and WO 2010/061140.

The fibrous blank 100 is woven in the form of a strip extending generally in a longitudinal direction $D_L$ corresponding to the longitudinal direction of the blade to be produced. In the fibrous blank 100, the blade core fibrous preform 200 has a variable thickness determined according to the longitudinal thickness and the profile of the blade to be produced. In its part intended to form a root pre-form, the fibrous preform 200 has a part with extra thickness corresponding to a root preform part 203. The fibrous preform 200 extends by a part of decreasing thickness corresponding to a shank preform part 204 intended to form the shank of the blade, then by an aerofoil body part preform part 205 intended to form the aerofoil body part of the blade core extending between the shank preform part 204 and a tip 206. The aerofoil body part preform part 205 has, in a transverse direction $D_T$ perpendicular to the direction longitudinal $D_L$, a profile with variable thickness between its front edge 2050 and its rear edge 2051. The aerofoil body part preform part 205 comprises first and second faces 2052 and 2053 extending between the edges 2050 and 2051 (FIG. 4) and intended to form, with the composite skin, the pressure-side face and the suction-side face, or vice versa, of the blade.

The blade core fibrous preform 200 is woven in a single piece and must have, after cutting of the nonwoven yarns of the blank 100, the almost-final shape and dimensions of the blade core ("net shape"). For this purpose, in the parts with thickness variations of the fibrous structure, such as in the part with decreasing thickness of the shank preform part 204, the thickness reduction of the preform is obtained by progressively removing weft layers during weaving.

Once the weaving of the blade core fibrous preform 200 in the blank 100 has been achieved, the nonwoven yarns are cut. The blade core fibrous preform 200 illustrated in FIG. 4 is then obtained, a structure woven in a single piece. The front edge 2050 of the aerofoil body part preform part 205 is intended to form the front edge 210 of the aerofoil body part 21 of the blade core 20, while the rear edge 2051 of the aerofoil body part preform part 205 is intended to form the rear edge 211 of the aerofoil body part 21 of the blade core 20.

The leading edge and/or the trailing edge of the blade of the final blade have a low thickness, for example less than 1 mm. This low thickness is difficult to attain with three-dimensional weaving due to the too large size or titre of the warp and weft yarns as well as the minimum number of yarn layers necessary to ensure good mechanical strength. In the example described here, the distal part 210a of the front edge 210 of the aerofoil body part 21 and the distal part 211a of the rear edge 211 of the spar 21 each has a thickness $E_{210a}$ and $E_{211a}$ of approximately 1.5 mm (FIG. 2).

In accordance with the invention, the front and rear edges of the aerofoil body part can be thinned by means of a composite skin having a two-dimensional woven fibrous reinforcement. More precisely, as illustrated in FIG. 5, two-dimensional woven plies, in this case two plies 230 and 231, are wound around the aerofoil body part preform part 205. In the example described here, first and second filler materials 50 and 51 are respectively placed on the distal ends 2050a and 2051a of the front and rear edges 2050 and 2051 of the spar part of the aerofoil body part 205 before the winding of the first ply 230 (FIG. 4).

The two-dimensional woven plies 230 and 231 each have a thickness of 0.2 mm, which enables a skin preform 230 to be formed, having a thickness of 0.4 mm corresponding to the thickness $E_{30}$ of the skin made of composite material 30. In the example described here, the ceramic skin preform makes it possible to obtain a leading-edge preform portion and a trailing-edge preform portion, each having a thickness $E_{BA}$ and $E_{BF}$ of 0.8 mm which is located on the final blade (FIG. 2). The leading edge and the trailing edge of the blade preferably have a thickness of between 0.2 mm and 1.5 mm.

The winding of the two-dimensional plies can be produced, in particular, in automated manner by a robot, which enables good repeatability and a control of the draping (no take-up, pinching, etc.).

A preform assembly 250 is thus obtained, comprising the blade core fibrous preform 200, the filler materials 50 and 51 and the skin preform 230. The following step consists of positioning a leading edge made of metal material 40 on the preform assembly 250 at the front edge of the spar preform part (FIG. 6).

The preform assembly 250 and the leading edge made of metal material 40 are placed in an injection mould. A liquid matrix precursor is then injected into the pores of the blade core fibrous preform and into the two-dimensional woven plies forming the skin preform.

More precisely, the assembly is placed in a mould that can be sealingly closed with a recess having the shape of the final moulded piece and able, in particular, to have a twisted shape corresponding to the final shape of the aerofoil. Then, the mould is closed and the liquid matrix precursor, for example a resin, is injected into the entire recess in order to impregnate the entire fibrous part of the assembly.

The transformation of the precursor into matrix, i.e. its polymerisation, is performed by heat treatment, generally by heating the mould, after removal of any solvent and cross-linking of the polymer, the preform always being held in the mould having a shape corresponding to that of the blade. The matrix can, in particular, be obtained from epoxy resins, such as the high-performance epoxy resin sold under reference PR 520 by CYTEC.

According to an aspect of the invention, the densification of the fibrous preform can be performed by the well-known method of resin transfer moulding (RTM). In accordance with the RTM method, the fibrous preform is placed in a mould having the outer shape of the aerofoil. A thermosetting resin is injected into the internal space defined between the part made of rigid material and the mould, and which comprises the fibrous preform. A pressure gradient is generally established in this inner space between the location where the resin is injected and the orifices for removal thereof, in order to control and optimise the impregnation of the preform by the resin.

The resin used can be, for example, an epoxy resin. The resins suitable for RTM methods are well-known. They preferably have a low viscosity in order to facilitate their injection into the fibres. The choice of the temperature class and/or the chemical nature of the resin is determined as a function of the thermomechanical stresses to which the part must be subjected. Once the resin is injected into the entire reinforcement, its polymerisation proceeds by heat treatment according to the RTM method.

The resin fulfils the role of binder between the fibrous reinforcement of the blade core 20 and the fibrous reinforcement of the skin made of composite material 30 and thus ensures the distribution of mechanical stresses or forces between the weaves of these two elements.

After the transformation of the resin into matrix, the part is demoulded. The blade 10 of FIG. 1 is then obtained, with a blade core made of composite material 20 forming the root 11, the shank 12 and a part of the aerofoil body 13 of the blade, a skin made of composite material 30 forming the other part of the aerofoil body 13 and the trailing edge 131 of the blade and a metal leading edge 40.

According to a particular feature of the according to the invention, the one or more two-dimensional woven plies are wound around the aerofoil body part preform part, such that the ends of each two-dimensional woven ply meet at the face of the aerofoil body part that is intended to form the suction-side face of the blade and at a position corresponding to 50% or more of the chord length of the blade measured from the leading edge to the trailing edge of the blade. Hence, the fibrous reinforcement of the skin 30 made of composite material has a continuous weave in the region of the leading edge of the blade, which ensures good mechanical strength in a region of the blade exposed to impacts with foreign bodies in the transverse direction $D_T$ (birds, hail, etc.). The ends of the one or more plies form a junction portion 31 at a suction-side face of the aerofoil body at a position corresponding to 50% or more of the chord length of the blade measured from the leading edge 40 to the trailing edge 131 of the blade 10 (FIGS. 1 and 2). A slight overlapping can be allowed between the ends of each ply. The junction between the ends of the plies is ensured by the resin injected and transformed into matrix in the plies. The ends of the plies can optionally be fixed together by sewing before injection of the resin.

According to another particular feature of the invention, the three-dimensional woven fibrous reinforcement of the blade core comprises carbon fibre yarns while the fibrous reinforcement of the skin comprises carbon fibre yarns and glass fibre yarns. The partial use of glass fibre yarns in the skin made of composite material, increases the deformation at break of the aerofoil body of the blade and, consequently, its impact resistance.

The invention claimed is:

1. A blade for an aircraft gas turbine engine comprising, in a longitudinal direction, a blade root, a shank and an aerofoil body, the aerofoil body extending in the longitudinal direction between the shank and a blade tip and in a transverse direction between a leading edge made of metal material and a trailing edge, the blade comprising: a blade core made of composite material having a three-dimensional woven fibrous reinforcement forming the blade root, the shank and an aerofoil body part, wherein the blade further comprises a skin made of composite material having a two-dimensional woven fibrous reinforcement surrounding the aerofoil body part of the blade core, the skin being interposed between the leading edge made of metal material and a front edge of the aerofoil body part of the blade core so as to define a thinned leading edge portion, the skin comprising one or more two-dimensional woven plies each wound around a spar of the blade core, the skin further defining the trailing edge of the blade, wherein a filler material is present at least between a distal end of the front edge of the aerofoil body part of the blade core and the skin made of composite material, wherein said filler material extends from the shank to the blade tip, wherein said filler material is a foam or a resin, wherein the blade further comprises a second filler material that is present between a distal end of the rear edge of the aerofoil body part of the blade core and the skin made of composite material, said second filler material extending from the shank to the blade tip and the second filler material being a foam or a resin, and
wherein the ends of each two-dimensional woven ply meet at a suction-side face of the aerofoil body outside the trailing edge, at a position corresponding to 50% or more of a chord length of the blade measured from the leading edge to the trailing edge of the blade.

2. The blade according to claim 1, wherein the leading edge and the trailing edge of the blade have a thickness of between 0.2 mm and 1.5 mm.

3. The blade according to claim 1, wherein the three-dimensional woven fibrous reinforcement of the blade core comprises carbon fibre yarns and wherein the fibrous reinforcement of the skin comprises carbon fibre yarns and glass fibre yarns.

4. A method for manufacturing a blade for an aircraft gas turbine engine comprising:
producing, by three-dimensional weaving, a fibrous blade core blank,
cutting the fibrous blank in order to obtain a fibrous blade core preform comprising, in a longitudinal direction, a blade root preform part, a shank preform part and an aerofoil body part preform part, the aerofoil body part preform part extending in the longitudinal direction between the shank preform part and a tip and in a transverse direction between a front edge and a rear edge,
winding one or more two-dimensional woven plies around the aerofoil body part preform part,
positioning a leading edge made of metal material on the one or more two-dimensional woven plies at the front edge of the aerofoil body part preform part,
placing the blade core fibrous preform wound with the one or more two-dimensional woven plies and the leading edge into an injection mould,
injecting a resin into the blade core fibrous preform and into the one or more two-dimensional woven plies, and
transforming the resin into a matrix so as to obtain a blade comprising a blade core made of composite material having a three-dimensional woven fibrous reinforcement, a skin made of composite material having a two-dimensional woven fibrous reinforcement present around an aerofoil body part of the blade core and a leading edge made of metal material fixed on said skin,
wherein, before the winding of one or more two-dimensional woven plies around the aerofoil body part preform part, a filler material is placed at least at a distal end of the front edge of the aerofoil body part preform part, wherein said filler material extends from the shank preform part to the tip, wherein said filler material is a foam or a resin, and wherein the blade further comprises a second filler material that is present between a distal end of the rear edge of the aerofoil body part of the blade core and the skin made of composite material, said second filler material extending from the shank to the blade tip and the second filler material being a foam or a resin, and wherein, during the winding of one or more two-dimensional woven plies around the aerofoil body part preform part, the ends of each two-dimensional woven ply meet at the face of the aerofoil body part preform part that is intended to form the suction-side face of the blade and outside a trailing edge of the blade, and at a position corresponding to 50% or more of a chord length of the blade measured from the leading edge to the trailing edge of the blade.

5. The method according to claim 4, wherein each two-dimensional woven ply has a thickness of approximately 0.2 mm.

6. The method according to claim 4, wherein the three-dimensional woven fibrous reinforcement of the blade core comprises carbon fibre yarns and wherein the fibrous reinforcement of the skin comprises carbon fibre yarns and glass fibre yarns.

* * * * *